Oct. 12, 1954  J. N. STRAUSS  2,691,387
FOOT VALVE FOR DIRECT ACTING SHOCK ABSORBERS
Filed Feb. 14, 1949  2 Sheets-Sheet 1
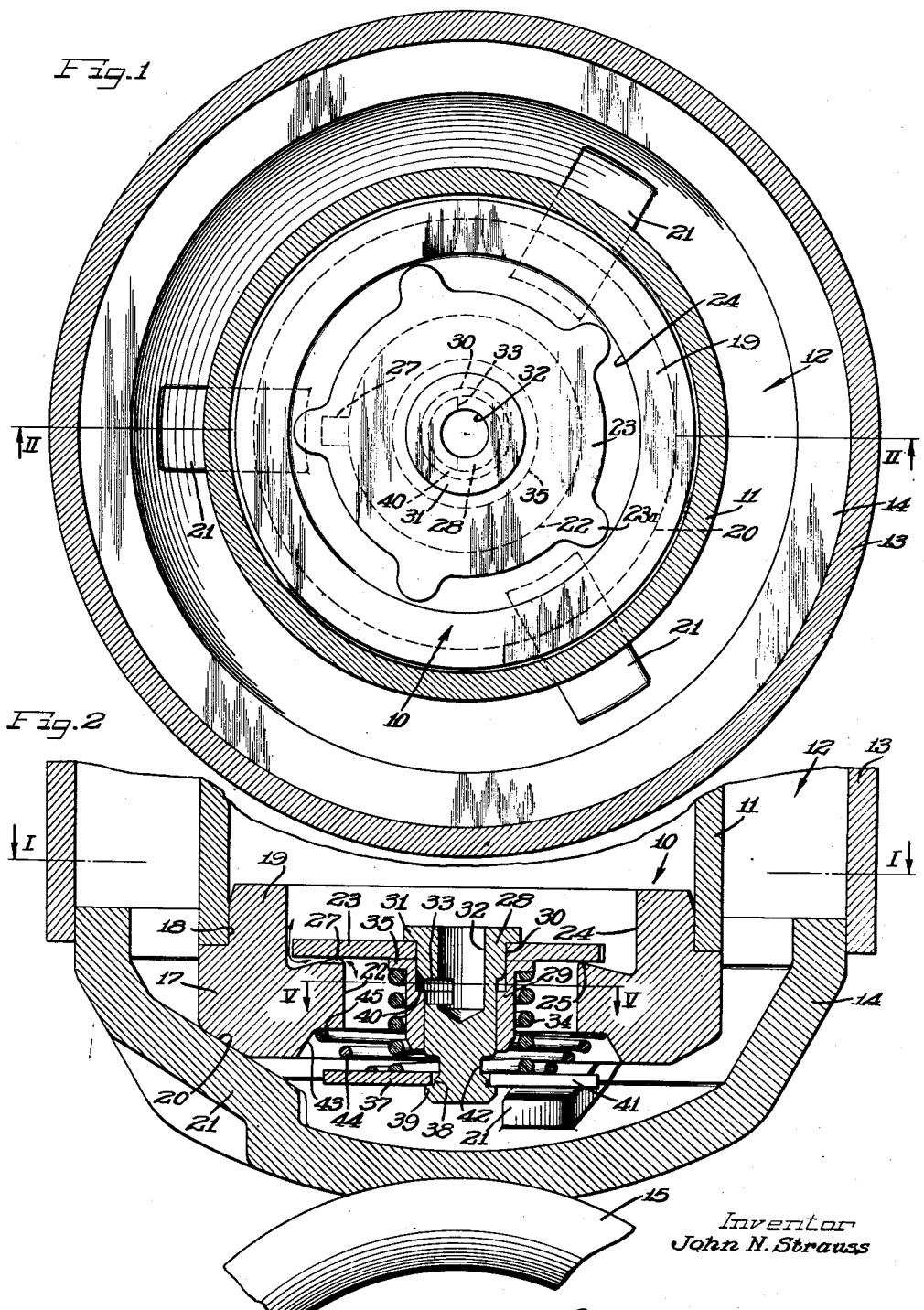
Inventor
John N. Strauss
By  Attys

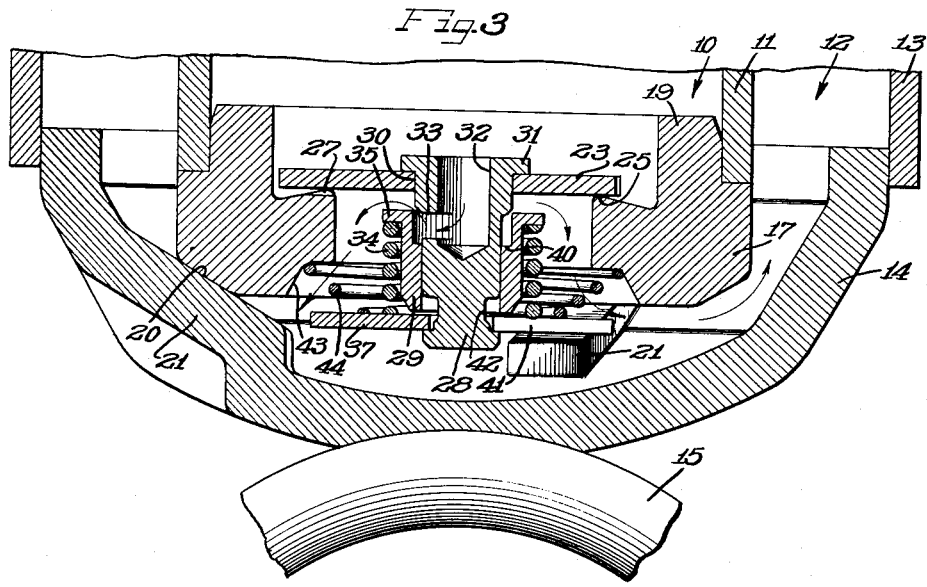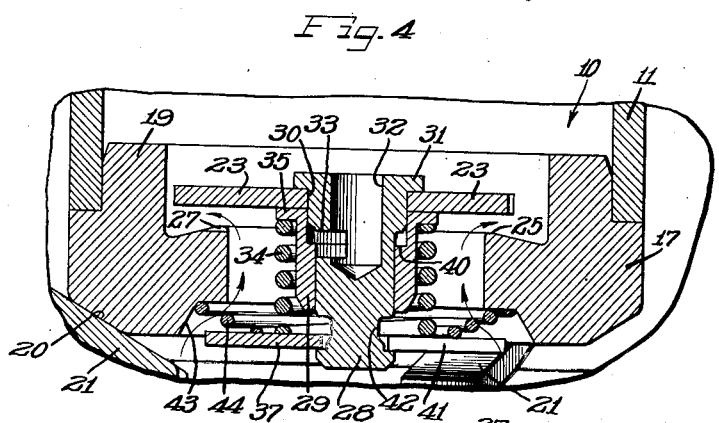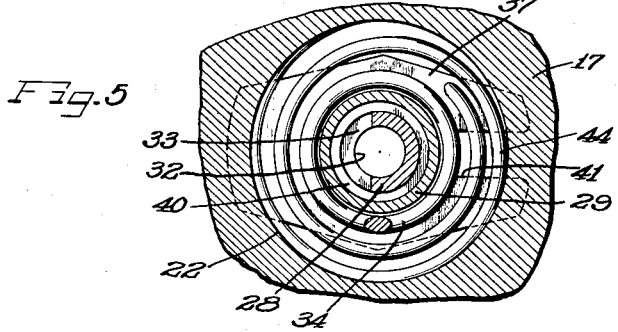

Patented Oct. 12, 1954

2,691,387

UNITED STATES PATENT OFFICE 2,691,387

FOOT VALVE FOR DIRECT ACTING SHOCK ABSORBERS

John N. Strauss, Williamsville, N. Y., assignor to Houdaille-Hershey Corporation, Detroit, Mich., a corporation of Michigan Application February 14, 1949, Serial No. 76,394

3 Claims. (Cl. 137—493.7)

The present invention relates to improvements in foot valve construction especially adapted for use in direct acting shock absorbers of the kind which are used as shock absorbers and snubbers between the sprung and unsprung portions of various types of vehicles such as automobiles or the like.

In direct acting or telescopic shock absorbers in which hydraulic fluid is displaced in operation between a cylinder chamber and a reservoir, a foot valve is customarily employed for controlling such fluid displacement.

Due to the many variables in operation and of temperature which must be met by a shock absorber of this type in service many problems have been encountered in the construction of the foot valves in endeavoring to attain satisfactory performance. Among the various problems which must be satisfactorily overcome, and which prior constructions have often not met as effectively as might be desired in one or more respects, may be mentioned avoidance of noiseness in operation, uniform performance throughout operating temperature ranges, adaptability to various compression requirements for specified installations, economy in manufacture, simplicity in assembly, and uniformity of results in mass produced units.

An important object of the present invention is to provide a foot valve construction for use in direct acting shock absorbers and which will satisfactorily meet the several problems and requirements as enumerated above, as well as others.

Another object of the invention is to provide a foot valve construction which is capable of mass production and in which the individual units or foot valve assemblies will perfrom with exceptionally close consistency of resulting compression forces.

A further object of the invention is to provide a foot valve construction which is free from high frequency vibrations in operation and is thus unusually quiet in operation.

Still another object of the invention is to produce a foot valve construction characterized by greatly increased resistance or work capacity over prior constructions, and in which by simple calculated modification as to certain specific dimensions a wide range of operational requirements as to compression resistance can be attained.

Yet another object of the invention is to provide an improved foot valve construction in which the increase in resistance at sub-normal temperatures is materially reduced in the presence of the hydraulic fluids customarily employed in direct acting shock absorbers.

A still further object of the invention is to provide a foot valve assembly which is economical in production and susceptible of mass production methods of assembly and is rugged and durable in service.

Other objects, features and advantages of the present invention will be readily apparent from the following detailed description of a preferred embodiment thereof taken in conjunction with the accompanying drawings, in which:

Figure 1 is an enlarged horizontal sectional view taken on the line I—I of Figure 2 through the lower portion of a direct acting shock absorber and showing a foot valve embodying the features of the present invention assembled therein;

Figure 2 is a vertical sectional detail view taken on substantially the line II—II of Figure 1;

Figure 3 is a sectional detail view similar to Figure 2 but showing the valve mechanism in the compression blow-off relationship;

Figure 4 is a sectional detail view similar to Figure 2 but showing the valve mechanism in the rebound blow-off or replenishment relationship; and Figure 5 is a fragmentary horizontal sectional detail view taken substantally on the line V—V of Figure 2.

A foot valve 10 embodying the features of the present invention is adapted to be utilized in a direct acting or telescopic shock absorber including a cylinder 11 within which is operable a piston attached to one part of a relatively movable assembly or apparatus, such as the sprung portion of an automobile or other vehicle. In the course of reciprocable operative movements of the piston, hydraulic fluid is displaced between the interior of the cylinder 11 and a reservoir 12 defined about the cylinder 11 by a larger diameter concentric cylindrical casing 13 which is fixedly mounted with respect to the cylinder 11. The casing 13 is permanently and hermetically connected to or forms part of an end cap or closure member 14 having means such as an attachment eye 15 by which the lower end of the shock absorber is attached to the remaining portion of the relatively moveable apparatus or members, such as the unsprung portion of a vehicle.

As a basic component of the foot valve assembly 10 a cage structure or member 17 is provided which is preferably of cylindrical form having a maximum diameter equal to that of the shock absorber cylinder 11 and assembled with the lower end of the cylinder which is fixedly seated as by press fit within an upper outer corner rabbet groove 18 in an upper annular portion 19 on the cage 17 fitting within the cylinder 11. The lower outer corner of the cage 17 is preferably tapered generally frusto-conically as at 20 to seat in centered relation upon similarly tapered or diagonally faced upwardly projecting centering and spacer projections or embossments 21. Three of the embossments 21 have been shown and these function to maintain the valve cage 17 spaced from the major opposing area of the end closure cap 14 so that relatively free passage between the underside of the foot valve assembly 10 and the reservoir 12 is afforded.

Fluid displacement through the valve cage 17 is by way of a fairly large diameter axial bore 22 therethrough. However, for proper operation of the shock absorber, substantial impedance to passage of fluid through the axial bore or port 22 on the compression stroke of the piston must be afforded, and substantially less impedance to rebound displacement flow of hydraulic fluid is desired. To this end, the valve assembly 10 includes a principal valve element 23 in control of the flow passage 22 and comprising a disk of generally smaller diameter than and received within an enlarged diameter upper portion of the fluid passage 22. By preference the periphery of the disk is provided with a series of radially extending centering projections 23a which are normally free from engagement with the wall defining the bore or passage enlargement 24 but serve to prevent the valve disk 23 from shifting to any appreciable extent radially, thus preventing radial displacement thereof from a valve seat shoulder 25 provided by an upwardly protruding lip formation at the upper end of the fluid passage 22 at juncture with the enlarged diameter valve accommodating upper portion 24 of the passage. Compression stroke displacement of hydraulic fluid is thus blocked by the valve 23 except for a limited metered displacement through a radial orifice groove 27 provided in the annular valve seat 25 to accommodate relatively low pressure normal displacement in the operation of the shock absorber. By predetermined variations in the cross sectional flow area of the orifice passage 27, or by providing a plurality of such passages or indentations in the annular valve seat 25 various anticipated installation requirements can be accommodated.

Compression stroke blow-off is provided for by equipping the main valve 23 with a blow-off valve assembly including a depending valve stem member 28 and a slidable sleeve valve member 29 cooperating with the stem member 28. To this end, the valve disk 23 is formed with an axial aperture 30 through which the stem member 28 extends in preferably press fitted relation, an annular radial flange 31 being provided on the head of the stem member and bearing against the upper face of the margin of the disk defining the aperture 30.

Below the disk valve member 23, the stem member 28 depends to a substantial extent and provides a cylindrical guide for the sleeve valve member 29 which slidably engages the stem member for reciprocal vertical operational movement.

The construction and relationship of the valve stem member 28 and the sleeve valve 29 are such that in the presence of predetermined compression pressure exerted within an upwardly opening axial throat or pocket bore 32 in the stem member and thence against the sleeve valve 29 the latter will be displaced for compression blow-off. For this purpose, a laterally opening port 33 intersectingly opens from the bottom portion of the throat bore 32 through the side of the valve stem member 28 and is normally closed by the sleeve valve 29 which is held in the blow-off port closing relation by means in the form of a helical compression spring 34 of slightly larger diameter than the sleeve valve and engaging a radial head flange 35 on the sleeve valve to urge the upper end of the sleeve valve against the under side of the disk valve 23.

A generally hair-pin-like spring retainer 37 provides an abutment for the lower end of the spring 34 and is engaged about a reduced diameter portion 38 of the lower part of the stem member 28. An upwardly facing terminal annular shoulder flange 39 on the stem member supports the retainer 37 in proper clearance relation below the lower end of the sleeve valve 29.

Compression blow-off fluid pressure is effective against the sleeve valve member 29 upon an upwardly facing, rabbet-like internal pressure shoulder 40 exposed to fluid pressure at the pressure port 33. By predetermining the effective area of the pressure shoulder 40 particular compression force values can be attained in the valve assembly for any particular loading of the spring 34. That is, where the spring load in the assembly is known, a small effective area in the shoulder 40 will require greater compression force to unseat the valve than a larger effective area in such shoulder. Hence there is provided by the present invention a means for effectively predetermining the compression force responsiveness of the foot valve for any particular service requirements without requiring any change in spring specifications. This is especially advantageous where due to space limitations a larger spring cannot be accommodated although an increase in compression blow-off resistance is required in the foot valve.

Improved compression blow-off resistance of the sleeve valve 29 is attained by requiring substantial unseating movement of the sleeve valve before actual compression blow-off occurs. To this end, sliding engagement of the sleeve valve 29 with the stem member 28 is provided for above and below the blow-off port 33 and the blow-off pressure shoulder 40. Accordingly, the stem member 28 is of larger diameter above the port 33, that is in the head portion thereof which extends into and through the valve disk aperture 30, and such larger diameter portion extends a substantial distance below the lower face of the valve disk 23. The upper end portion of the sleeve valve 29 is formed of increased internal diameter above the shoulder 40 complementary to the enlarged upper diameter of the stem member so as to be in slidable engagement therewith. The shoulder 40 is located in spaced relation below the upper edge of the blow-off port 33 and the lower shoulder defined by the upper enlarged portion of the valve stem 28, so as to be exposed throughout the annular area of the shoulder to the force of the compression fluid exerted through the port 33. As a result, the sleeve valve 29 is exposed uniformly to compression force of the hydraulic fluid but such compression force must be of a value which will act against the compression blow off shoulder 40 strong enough to overcome the load of spring 34 sufficiently to depress the sleeve valve 29 to clear its upper end below the lower edge of the larger diameter upper portion of the stem 28 before compression displacement of the hydraulic fluid will occur past the sleeve valve 29. The length of overlap of the upper portion of the sleeve valve 29 with the enlarged upper portion of the stem 28 thus also is a factor in the compression blow off resistance value of the spring assembly. In Figure 3 is shown the relationship of the valve elements during compression blow-off, hydraulic fluid displacement during such blow-off past the sleeve valve 29 being indicated by the directional arrows.

As clearly illustrated in Figures 2, 3 and 4, the shoulder, defined at juncture of the enlarged head portion of the stem 28 with the reduced diameter ported portion of the stem, is chamfered. This not only facilitates sliding of the internally enlarged head end portion of the sleeve relative to the enlarged portion of the stem, but, as will be appreciated from inspection of Figure 3, affords gradual metering of flow of fluid past the head end of the sleeve valve from the cracking of the valve in operation and as the valve moves under fluid pressure toward a more open position relative to the compression blow-off port 33.

Maximum displacement of the sleeve valve 29 during blow-off is limited by engagement of the lower end of the sleeve valve with the spring retainer 37 which thus serves as a lower limit stop for the sleeve valve.

Assembly of the retainer and stop member 37 with the valve stem 28 is facilitated by providing the retainer with a slot 41 which is narrower than the diameter of the portion 38 of the stem about which the retainer is engaged, but which will pass a smaller diameter neck portion 43 immediately above the portion 38. Hence when the retainer and stop member 37 has been assembled with the stem it is held against horizontal displacement from the stem, but assembly or disassembly is facilitated by the slot and reduced diameter neck relationship of the retainer end of the stem.

Another function of the retainer member is to prevent excessive upward displacement of the valve disk member 23 during the rebound stroke of the piston in the shock absorber and replenishment or return flow into the cylinder 11 from the reservoir 12. To this end, the retainer and stop member 37 is carried by the stem 38 at an elevation below the lower end of the valve cage 19 or at least a lower enlarged diameter portion 43 of the fluid passage through the valve cage. The member 37 extends laterally to a greater distance than the diameter of the fluid displacement passage 22 on at least diametrically opposite sides of the valve stem 28, substantially as seen in Figs. 2 and 5.

Limited resistance to replenishment flow of hydraulic fluid is afforded by means comprising a spiral coil spring 44 which has a smaller diameter end resting upon the retainer member 37 and a larger diameter end abutting a downwardly facing shoulder 45 on the valve cage afforded by the enlarged diameter lower end recess 43. The spring 44 is a relatively weak spring which at all times tends to urge the valve stem 28 and thus the disk valve 23 downwardly to maintain the disk valve seated on the valve seat 25.

In operation, normal relatively low magnitude fluctuations of the shock absorber piston are accommodated by fluid displacement through the orifice passage 27. Compression stroke blow-off occurs, as shown in Fig. 3, when compression stroke force upon the hydraulic fluid is great enough to unseat the compression blow-off sleeve valve 29. On rebound, hydraulic fluid replenishment is effected by upward displacement of the disk control valve 23 in opposition to the relatively weak return spring 44, substantially as shown in Fig. 4 wherein the directional arrows indicate replenishment flow of the hydraulic fluid.

I claim as my invention:

1. In a foot valve structure adapted for use in a direct acting shock absorber, a valve cage member having a port of substantial diameter extending vertically therethrough, an annular valve seat in the upper portion of said port, a disk valve seating on said seat and having a stem projecting downwardly through said port, said stem being of smaller diameter than said port, a shoulder at the lower portion of said port facing generally downwardly in a plane substantially normal to the axis of the port and being disposed at a substantially higher elevation than the lower end portion of said stem, a retainer on said lower end portion of the stem extending laterally normally to underlie said shoulder in substantial spaced relation, and a spiral coil spring having the smaller end portion thereof engaging said retainer and the larger end portion thereof engaging said shoulder above the retainer and normally biasing said retainer and thereby said stem and the disk valve downwardly for seating of the disk valve on said valve seat, said upper end portion of the spring being interposed between said shoulder and the underlying portion of said retainer, said upper end portion of the spring providing a stop engageable by the retainer to limit upward movement of the disc valve and stem assembly.

2. In combination in a foot valve structure for a direct acting shock absorber, a valve cage member having an axial fluid displacement passage therethrough, a disk valve seated over said passage to check compression stroke fluid displacement through said passage, a stem depending from said disk valve and of substantially smaller diameter than said passage, said stem having an enlarged diameter head end portion extending to a substantial distance below said disk valve and a reduced diameter portion extending to a substantial distance below said enlarged diameter portion, said stem having a bore opening thereinto from the head extremity with a blind end of the bore disposed below the juncture of the enlarged and smaller diameter portions of the stem and with a port opening from the inner end portion of the bore through the smaller diameter portion of the stem adjacent to said juncture, a reciprocable sleeve valve member internally complementary to and slidably engaging said enlarged and smaller diameter portions of the stem below said disk valve, said sleeve valve having an internal upwardly directed shoulder spaced from its upper end a greater distance than the length of the larger diameter portion of the stem below the disk valve so that said shoulder is exposed to fluid pressure through said port, and means normally biasing said sleeve valve into engagement at its head end with said disk valve with a predetermined thrust force adapted to compel delayed response of the sleeve valve to fluid pressure against said shoulder substantially supplemented by the necessity for the enlarged diameter head end portion of the sleeve valve to slide downwardly past the length of the enlarged diameter portion of the stem below the disk valve and above said port before cracking of the valve for passage of the fluid from said bore through said port past the sleeve valve.

3. A valve structure as defined in claim 2 wherein at juncture of the enlarged diameter head of the stem with the reduced diameter portion of the stem there is a shoulder that is chamfered to facilitate sliding of the upper end of the sleeve valve member thereby and also to afford metering of fluid thereby as said upper end of the sleeve valve member moves thereby in operation.

References Cited in the file of this patent

UNITED STATES PATENTS

| Number | Name | Date |
|---|---|---|
| 1,244,382 | Slinack | Oct. 23, 1917 |
| 1,865,460 | Elsey | July 5, 1932 |
| 1,884,262 | Rossman | Oct. 25, 1932 |
| 1,991,043 | Bates | Feb. 12, 1935 |
| 2,148,839 | Rossman | Feb. 28, 1939 |
| 2,346,275 | Read | Apr. 11, 1944 |